(12) United States Patent
Vaknin

(10) Patent No.: US 12,492,496 B2
(45) Date of Patent: Dec. 9, 2025

(54) MESH STRUCTURE AND METHOD OF FORMING THE MESH STRUCTURE

(71) Applicant: AVI PLAST PLASTIC INDUSTRIES LTD., Mevo'ot Gilboa (IL)

(72) Inventor: Roi Vaknin, Ram-On (IL)

(73) Assignee: AVI PLAST PLASTIC INDUSTRIES LTD, Mevo'ot Golboa (IL)

( * ) Notice: Subject to any disclaimer, the term of this patent is extended or adjusted under 35 U.S.C. 154(b) by 0 days.

(21) Appl. No.: 18/284,312

(22) PCT Filed: Apr. 6, 2022

(86) PCT No.: PCT/IB2022/053245
§ 371 (c)(1),
(2) Date: Sep. 27, 2023

(87) PCT Pub. No.: WO2022/215013
PCT Pub. Date: Oct. 13, 2022

(65) Prior Publication Data
US 2024/0318363 A1   Sep. 26, 2024

Related U.S. Application Data

(60) Provisional application No. 63/171,715, filed on Apr. 7, 2021.

(51) Int. Cl.
*D04H 1/54* (2012.01)
*B29B 17/00* (2006.01)
(Continued)

(52) U.S. Cl.
CPC ............ *D04H 1/54* (2013.01); *B29B 17/0036* (2013.01); *B29B 17/0412* (2013.01);
(Continued)

(58) Field of Classification Search
CPC ........ D04H 1/54; D04H 1/4274; B65H 35/00; B29D 28/00
See application file for complete search history.

(56) References Cited

U.S. PATENT DOCUMENTS 3,650,877 A    3/1972  Johnson
4,296,168 A *  10/1981 Ambrose .................. D04H 1/54
                                              442/415
(Continued)

FOREIGN PATENT DOCUMENTS

EP       0006507 A2 *  1/1980  ............... D06H 7/22

OTHER PUBLICATIONS

Textile Glossary, Mesh, copyright Celanese Acetate 2001 (Year: 2001).*
(Continued)

*Primary Examiner* — Jennifer A Steele
(74) *Attorney, Agent, or Firm* — Roach Brown McCarthy & Gruber, P.C.; Kevin D. McCarthy

(57) ABSTRACT

A method of forming a mesh from thermoplastic material includes the steps of: providing an apparatus comprising a shredder and a binding station, urging thermoplastic material through the shredder to from strips of shredded material, and then transferring the shredded thermoplastic material through the binding station to form a more integral mesh formation from the shredded thermoplastic material. Such mesh material can be used for a variety of applications such as cushioning or the like.

7 Claims, 4 Drawing Sheets

(51) Int. Cl.
  *B29B 17/04* (2006.01)
  *B29D 28/00* (2006.01)
  *B29K 105/26* (2006.01)
  *B29L 7/00* (2006.01)
  *B65H 35/00* (2006.01)
  *B65H 37/04* (2006.01)
  *D04H 1/4274* (2012.01)

(52) U.S. Cl.
  CPC ............ *B29D 28/00* (2013.01); *B65H 35/00* (2013.01); *B65H 37/04* (2013.01); *D04H 1/4274* (2013.01); *B29B 2017/0476* (2013.01); *B29K 2105/26* (2013.01); *B29L 2007/008* (2013.01)

(56) References Cited

U.S. PATENT DOCUMENTS

| | | | |
|---|---|---|---|
| 4,484,377 A * | 11/1984 | Morel | D01G 11/02 241/97 |
| 4,618,385 A | 10/1986 | Mercer | |
| 4,716,712 A | 1/1988 | Gill | |
| 5,173,352 A * | 12/1992 | Parker | B65D 81/05 428/184 |
| 5,712,020 A * | 1/1998 | Parker | B31D 5/006 428/184 |
| 6,623,676 B1 | 9/2003 | Davis et al. | |
| 7,514,026 B1 | 4/2009 | Zafiroglu | |
| 2004/0038793 A1 | 2/2004 | Lencoski | |
| 2004/0101637 A1 | 5/2004 | Stepanek | |
| 2005/0221031 A1 * | 10/2005 | Weder | B31D 5/0078 206/521 |
| 2011/0108454 A1 | 5/2011 | Weder | |
| 2017/0135431 A1 * | 5/2017 | Weder | B65B 5/12 |

OTHER PUBLICATIONS

International Application No. PCT/IB22/53245, International Search Report and Written Opinion, mailed Jul. 6, 2022.
International Application No. PCT/IB22/53245, International Preliminary Report on Patentability (Chapter II), mailed Aug. 26, 2023.

* cited by examiner

MESH STRUCTURE AND METHOD OF FORMING THE MESH STRUCTURE

TECHNICAL FIELD

Embodiments of the invention relate to a mesh structure and method of forming the mesh structure, in particular a mesh structure made from thermoplastic material.

BACKGROUND

Techniques for re-use of plastic materials, which employ a step of mechanically shredding the plastic materials, are commonly known.

U.S. Pat. No. 6,623,676 for example describes a continuous process for reusing scrap polyurethane that involves the stages of moving chips of thermoset polyurethane foam while heating and subjecting the chips to heat and pressure to form a web. The resulting material is said to be useful in many industrial applications, including padding, gaskets, and insulation.

U.S. Pat. No. 7,514,026 in another example describes a method for recycling used floor covering that are shredded to form a fibrous dispersion. The shredded fibrous dispersion is conveyed into a chute feeder which converts it into a batt that is heated, compressed, and cooled to form a durable backing particularly suitable for flooring applications.

Thermoplastic flexible films, such as laminates, Polyethylene, Polypropylene, PET, polyester. Polyamide (and the like) may often become waste materials that cannot be used for their intended purpose. Reasons for such outcome may be inadequate storage conditions where the thermoplastic materials may be exposed to the elements, which in turn degrade the properties of the thermoplastic materials rendering them un-useful for their intended use. Other reasons may be due to mistaken or outdated printings on such materials that render the films as unusable for their intended use. Further reasons for such unusable waste material may be due to e.g. waste material created during printing, cutting or packaging process (or the like). Such materials may come in form of reels of sheets of material, in bales of thermoplastic material (or the like).

Finding an alternative use where the still existing properties in such degraded low cost (or possibly free of charge) thermoplastic materials can be useful, is advantageous both from a commercial as well as an environmental stand point.

SUMMARY

The following embodiments and aspects thereof are described and illustrated in conjunction with systems, tools and methods which are meant to be exemplary and illustrative, not limiting in scope.

In an embodiment there is provided a method of forming a mesh structure from thermoplastic material, comprising the steps of: providing an apparatus comprising a shredder and a binding station, urging thermoplastic material through the shredder to from strips of shredded material, and then transferring the shredded thermoplastic material through the binding station to form a more integral mesh formation from the shredded thermoplastic material.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
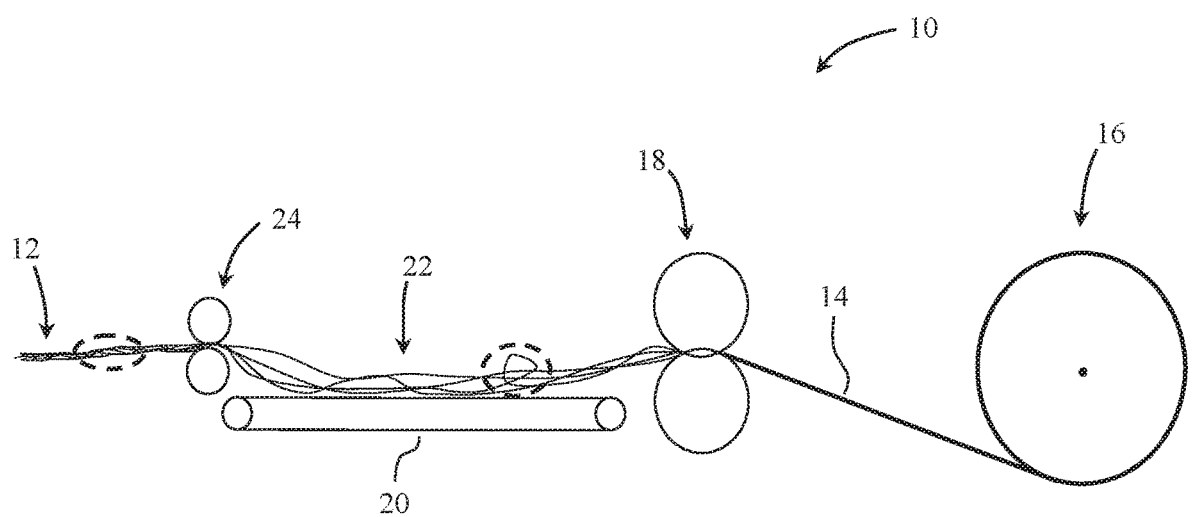
FIG. 1A schematically shows an apparatus for forming a mesh from a coil of thermoplastic material in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically illustrating an apparatus 10 for forming a mesh 12 according to an embodiment of the present invention. Apparatus 10 in this example is arranged to transfer downstream thermoplastic material 14 (possibly thermoplastic laminate materials), here optionally from a coil 16, towards a shredder 18 of the apparatus. Examples of Thermoplastic materials that may be useful for the various embodiments of the present disclosure may include thermoplastic flexible films, such as laminates, Polyethylene, Polypropylene, PET, polyester. Polyamide (and the like).

As seen in e.g. FIG. 1, the thermoplastic material 14 may be in form of a sheet of material here possibly rolled on a reel. In other embodiments, bales (not shown) comprising thermoplastic material may be used for supplying the material of e.g. the thermoplastic material 14. Thermoplastic materials in such bales may be of recycled plastics received from Material Recycling Facilities (or the like).

The apparatus includes in addition an optional conveyor 20 for conveying the thermoplastic material in its shredded form 22 after passing through shredder 18, in a downstream direction towards a binding station 24 where the shredded material 22 can be transformed into a mesh 12 that is suitable for a variety of applications.

In the example seen in FIG. 1A, binding station is in an optional form of a heating station where the shredded thermoplastic material 22 may be formed into the mesh 12. In the example seen in FIG. 1B, binding station is in an optional form of a packaging station, such as a flow pack machine or wrapper, where the shredded thermoplastic material 22 may be formed into the mesh 12.

Shredder 18, in accordance with various aspects of the present invention, may be of various types, such as a double-roller single-shaft shredder type, a twin Roll Rotor Double Single Shaft (or the like). In the example detailed herein below, an option of shredder 18 being embodied as a double shaft shearing type shredder will be discussed.

Figure 2:
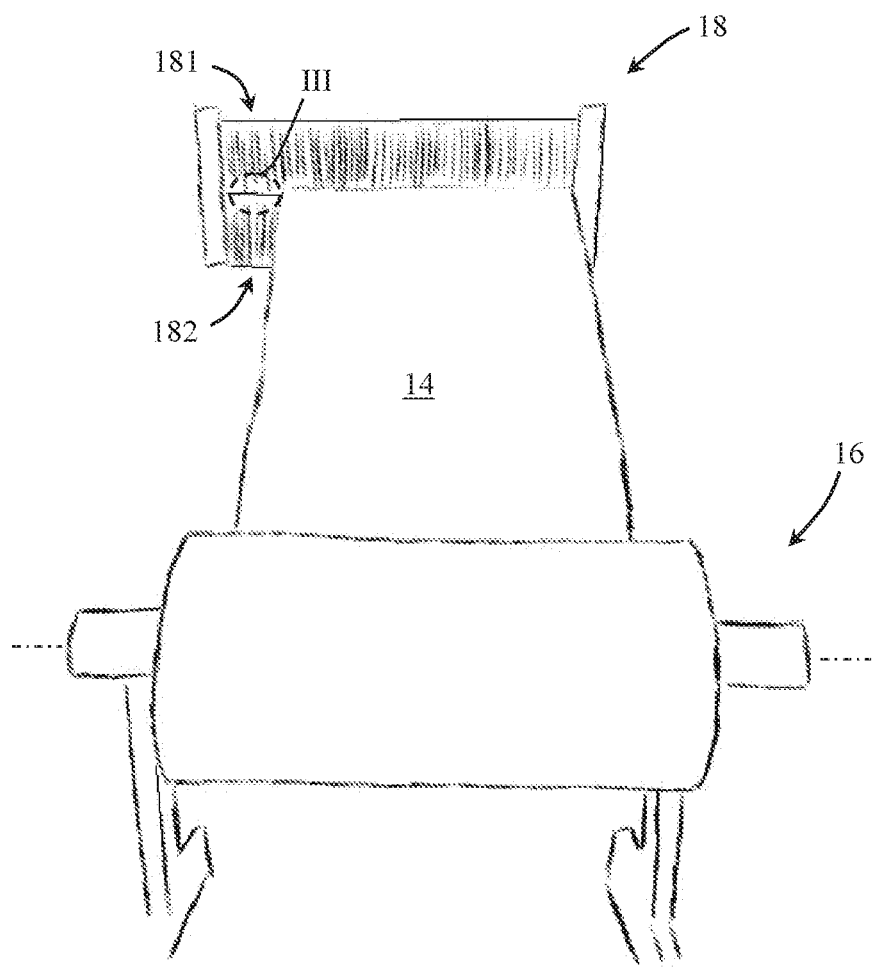
FIG. 2 schematically shows a view of an embodiment of a shredder of an apparatus such as that shown in FIG. 1 receiving incoming material.

Attention is drawn to FIG. 2 providing a view of the thermoplastic material 14 as it is transferred downstream to enter shredder 18. In an embodiment of the present invention, shredder 18 may be in the preferable form of a double shaft shearing type shredder, here seen including upper and lower shaft members 181, 182.

Figure 3:
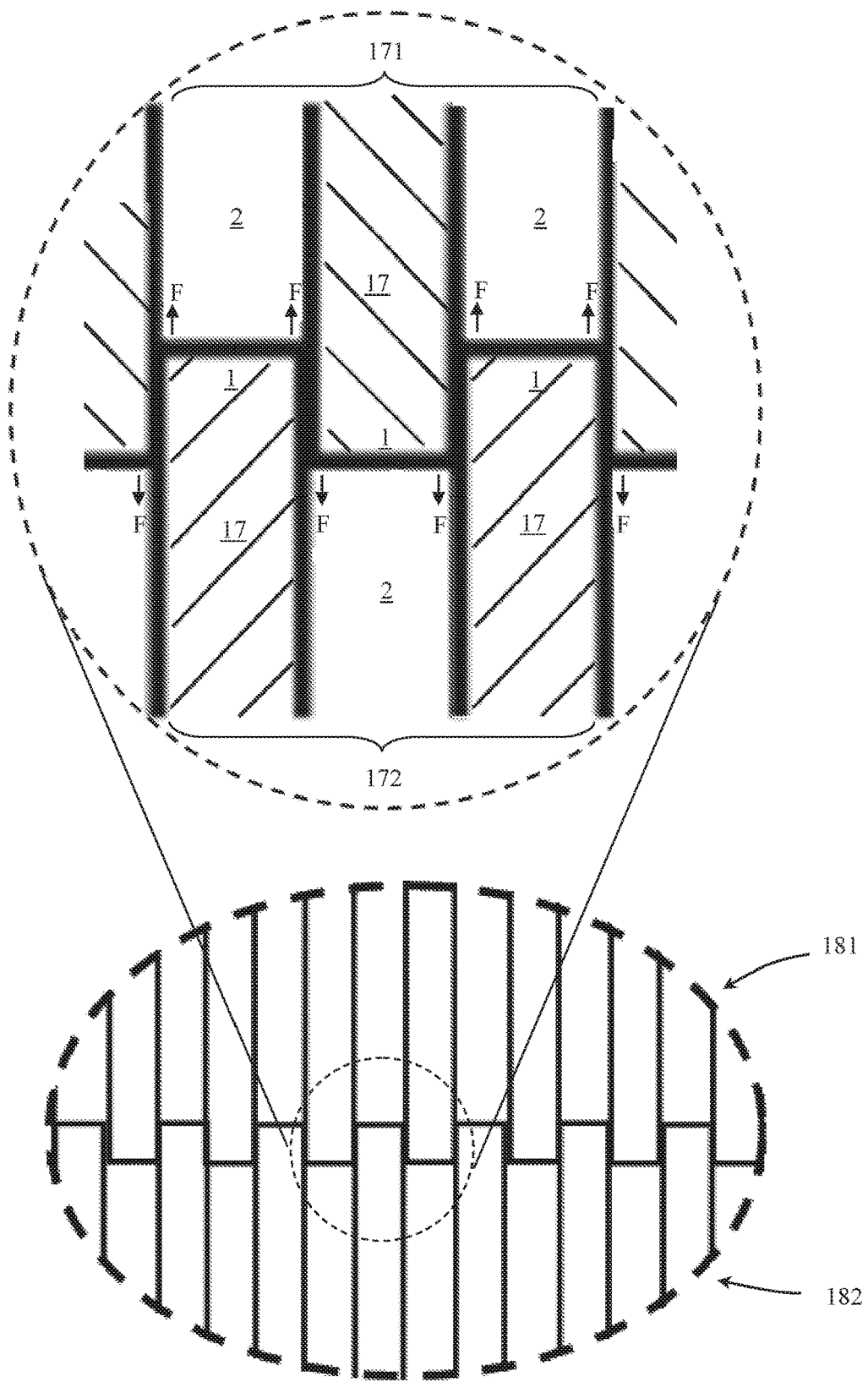
FIG. 3 schematically shows enlarged sections of a portion of the shredder shown in FIG. 2.

Attention is drawn to FIG. 3 providing an enlarged view of a section III of shredder 18 where the shaft members 181, 182 engage. Each one of the shaft members includes in this illustrated example a respective array 171, 172 of spaced apart teeth 17; and the teeth tip regions 1 of each array are arranged to be located within spacing's 2 formed between teeth 17 of the opposing array of the other shaft member—where the shaft members 181, 182 engage.

The material 14 passing through this region where the shaft members 181, 182 engage—may be subjected to substantial shearing forces F applied by the engaging teeth to thereby form substantially continuous strips of shredded material that are substantially detached one from the other.

In an aspect of the present invention, the shearing forces F applied to the material while forming each strip—deform the thermoplastic material within each strip giving rise to curling spring like formations at each strip.

Figure 4:
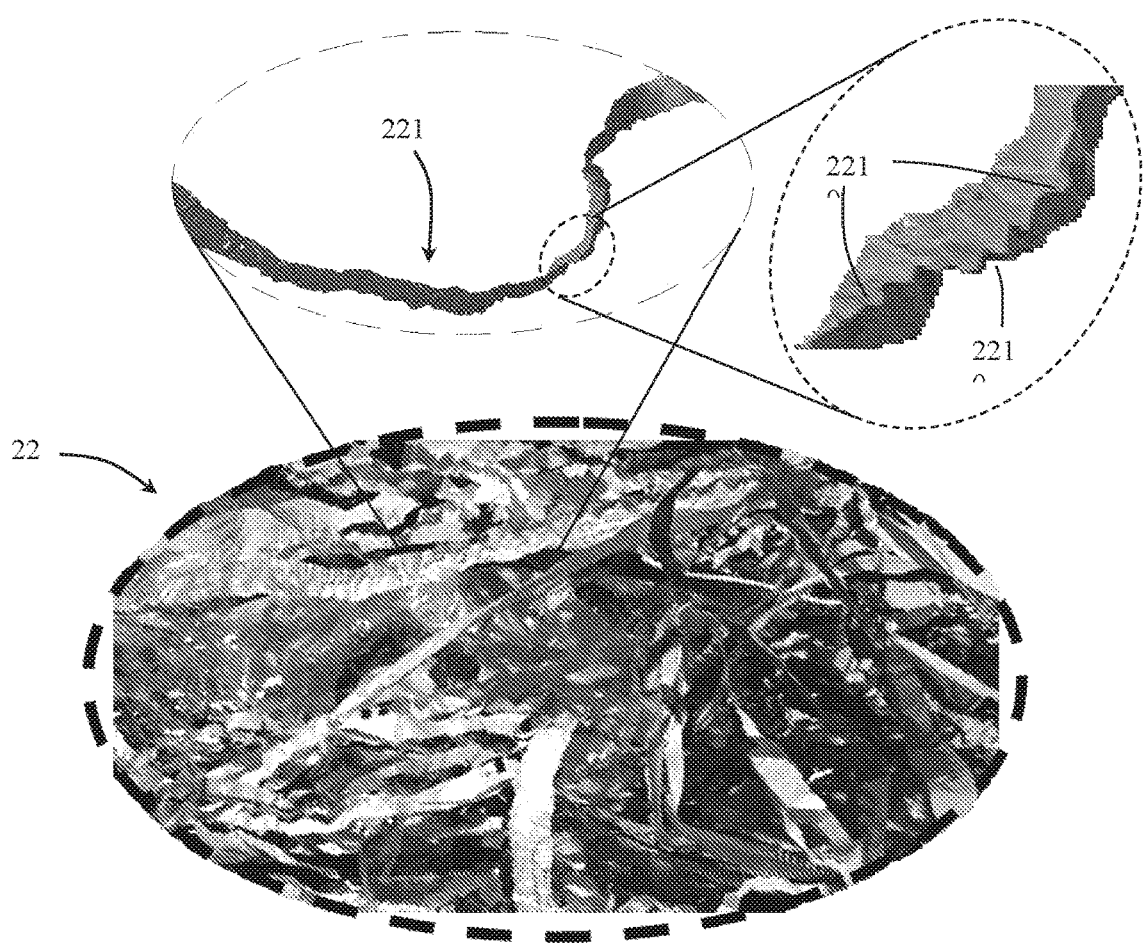
FIG. 4 schematically shows strips of thermoplastic material after being shredded by a shredder such as that shown in FIG. 3.

Attention is drawn to FIG. 4 illustrating a series of enlarged sections starting from the thermoplastic material in its shredded form 22 after passing through shredder 18, and then an enlargement of this section showing a single strip 221, and then yet a further enlargement showing a closer view of strip 221 revealing spring like curling formations 2210 formed within each strip due to its passage through shredder 18.

The thermoplastic material in its shredded form 22 consequently exhibits spring like elasticity due to its formation from intertwined strips—and thus shredded form 22 may be viewed as having a foam-like spring structure with pockets of air formed therein in between the intertwined strips.

With attention drawn back to FIG. 1A, the thermoplastic material in its shredded form 22 can be seen then being transferred within apparats 10 via a binding station 24 to form mesh 12. In an aspect of the present invention, binding station 24 may function to at least slightly stabilize the thermoplastic material in its shredded form so that it assumes a more usable structure that may have a variety of utilities.

Binding station 24 in the optional form of a heating station is embodied in the form of a pair of hot wheels through which the shredded material passes, however in other embodiments (not shown) the heating station may be in the form as any means suitable for melting at least partially thermoplastic material (e.g. by applying heat, ultrasonic vibrations, etc.).

Figure 5:
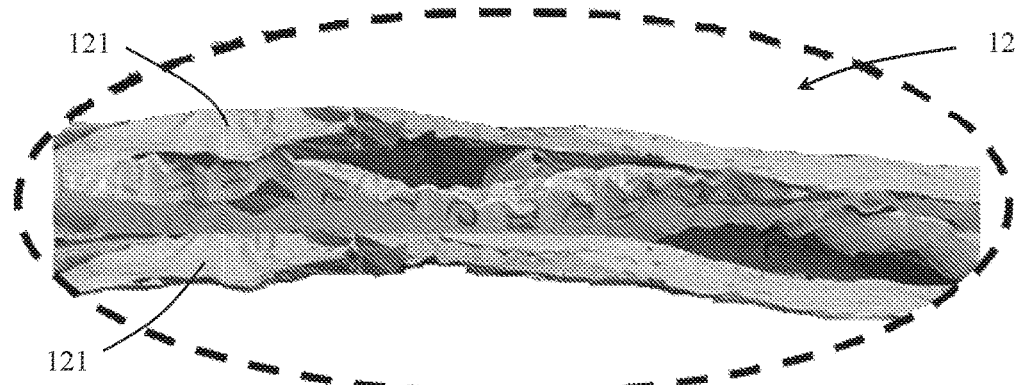
FIG. 5 schematically shows a section a mesh according to an embodiment of the present invention.

Attention is drawn to FIG. 5 illustrating an embodiment of mesh 12 where both its upper and lower sides 121 have been slightly melted due to exposure to heating station. The reforming of at least some of the thermoplastic material within mesh 12, by urging slight melting and then hardening of thermoplastic material—transforms mesh 12 into a slightly more integral formation making it accordingly suitable for a variety of applications.

Figure 1B:
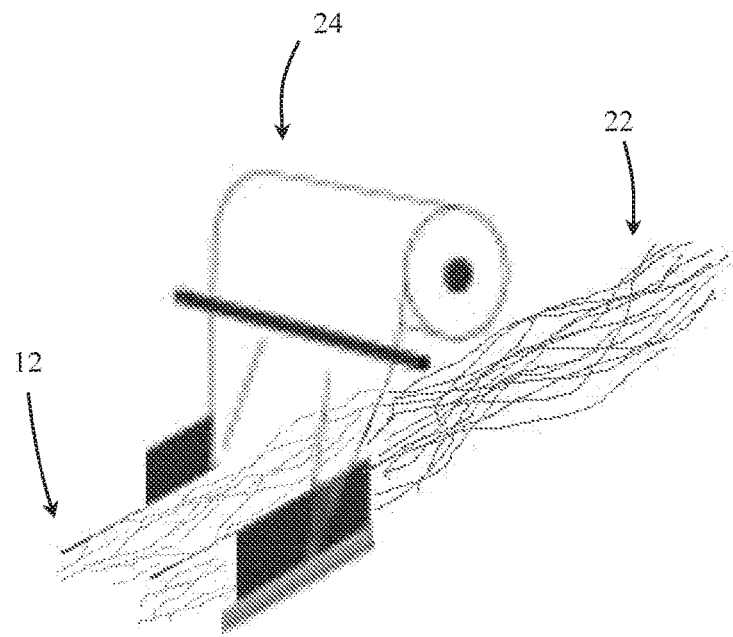
FIG. 1B schematically shows a possible binding station that may be used in the apparatus of FIG. 1A.

As aforementioned, binding station 24 may be in a variety of formations, such as the heating station seen FIG. 1A, packaging station seen in FIG. 1B, or any other suitable solution that assists in forming the more integral and useable formation of the mesh.

In a non-binding example, mesh 12 may be utilized as an insulation and/or lining and/or cushioning and/or packaging material for a variety of object types.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A method of forming a foam-like mesh structure, comprising the steps of:
    providing an apparatus comprising a double shaft shearing type shredder and a binding station in form of a heating station;
    providing a flexible thermoplastic film or film-sheet;
    urging the flexible thermoplastic film or film-sheet through the double-shaft shearing type shredder, wherein the shredder applies controlled shearing forces to produce substantially continuous strips of shredded flexible thermoplastic film or film-sheet, and then
    transferring the shredded flexible thermoplastic film or film-sheet through the binding station to form the foam-like mesh structure with air pockets formed between the strips of shredded flexible thermoplastic film or film-sheet, wherein the strips are intertwined,
    wherein most of the strips of shredded flexible thermoplastic film or film-sheet are substantially continuous, and
    wherein the strips of shredded flexible thermoplastic film or film-sheet comprise spring like curling formations as a result of shearing deformation, and wherein the strips of shredded flexible thermoplastic film or film-sheet are intertwined in the mesh structure.

2. The method of claim 1, wherein the heating station is adapted to melt one or more outer sides of the shredded flexible thermoplastic film or film-sheet to form the more integral mesh formation of the foam-like mesh structure.

3. The method of claim 1, wherein the shredder comprises a pair of shaft members and the flexible thermoplastic film or film-sheet passes through the shredder in between the pair of shaft members.

4. The method of claim 3, wherein each shaft member comprises an array of spaced apart teeth and the teeth tip regions of each array are arranged to be located within spacing's formed between teeth of the opposing array of the other shaft member where the shaft members engage.

5. The method of claim 4, wherein urging the flexible thermoplastic film or film-sheet through the shredder exposes the flexible thermoplastic film or film-sheet to shearing forces applied by the engaging teeth to thereby form the shredded flexible thermoplastic film or film-sheet.

6. The method of claim 5, wherein the shearing forces applied to the flexible thermoplastic film or film-sheet while forming each strip within the shredded flexible thermoplastic film or film-sheet deform the flexible thermoplastic film or film-sheet within each strip giving rise to curling spring like formations at each strip.

7. The method of claim 1, wherein the foam-like mesh structure is used as an insulation and/or lining and/or cushioning and/or packaging material.

\* \* \* \* \*